United States Patent
Kato et al.

(10) Patent No.: US 12,467,923 B2
(45) Date of Patent: Nov. 11, 2025

(54) IMMUNOCHROMATOGRAPHIC DEVICE FOR EXTRACTING AND MEASURING SUGAR CHAIN ANTIGEN

(71) Applicant: Denka Company Limited, Tokyo (JP)

(72) Inventors: Daisuke Kato, Niigata (JP); Shino Muramatsu, Niigata (JP)

(73) Assignee: Denka Company Limited, Tokyo (JP)

( * ) Notice: Subject to any disclaimer, the term of this patent is extended or adjusted under 35 U.S.C. 154(b) by 621 days.

(21) Appl. No.: 17/766,106

(22) PCT Filed: Oct. 2, 2020

(86) PCT No.: PCT/JP2020/037536
§ 371 (c)(1),
(2) Date: Apr. 1, 2022

(87) PCT Pub. No.: WO2021/066139
PCT Pub. Date: Apr. 8, 2021

(65) Prior Publication Data
US 2022/0365084 A1 Nov. 17, 2022

(30) Foreign Application Priority Data
Oct. 4, 2019 (JP) .................................. 2019-184047

(51) Int. Cl.
*G01N 33/569* (2006.01)
*G01N 33/543* (2006.01)

(52) U.S. Cl.
CPC . *G01N 33/56944* (2013.01); *G01N 33/54388* (2021.08)

(58) Field of Classification Search
None
See application file for complete search history.

(56) References Cited

U.S. PATENT DOCUMENTS

| | | | |
|---|---|---|---|
| 5,506,041 A | 4/1996 | Tanaka et al. | |
| 7,972,872 B2 | 7/2011 | Shida et al. | |
| 8,679,812 B2 | 3/2014 | Shiga | |
| 2003/0143639 A1 | 7/2003 | Matsushita et al. | |
| 2008/0194013 A1 | 8/2008 | Shida et al. | |
| 2008/0206849 A1 | 8/2008 | Zak et al. | |
| 2009/0170072 A1 | 7/2009 | Mink et al. | |
| 2012/0034140 A1 | 2/2012 | Ohmiya et al. | |
| 2014/0271400 A1 | 9/2014 | Cheng et al. | |
| 2014/0294930 A1 | 10/2014 | Nizet et al. | |
| 2015/0010918 A1 | 1/2015 | Ruvinsky | |
| 2015/0168397 A1 | 6/2015 | Stankov | |
| 2016/0167042 A1 | 6/2016 | Tyrrell et al. | |
| 2016/0370368 A1 | 12/2016 | Kato et al. | |
| 2018/0143195 A1 | 5/2018 | Saito et al. | |
| 2018/0209970 A1 | 7/2018 | Kato et al. | |
| 2020/0038854 A1 | 2/2020 | Kato et al. | |
| 2020/0049703 A1 | 2/2020 | Kato et al. | |
| 2020/0225198 A1 | 7/2020 | Suzuki et al. | |
| 2020/0355679 A1 | 11/2020 | Azuma et al. | |
| 2021/0325384 A1 | 10/2021 | Kato et al. | |

FOREIGN PATENT DOCUMENTS

| | | |
|---|---|---|
| CN | 101002095 A | 7/2007 |
| CN | 101002097 A | 7/2007 |
| CN | 108713142 A | 10/2018 |
| EP | 3 032 260 A1 | 6/2016 |
| EP | 3 324 185 A1 | 5/2018 |
| EP | 3 425 398 A1 | 1/2019 |
| EP | 3 470 841 A1 | 4/2019 |
| EP | 3 598 130 A1 | 1/2020 |
| EP | 3 598 131 A1 | 1/2020 |
| JP | 2001-337091 A | 12/2001 |
| JP | 2005-061910 A | 3/2005 |
| JP | 2005-331463 A | 12/2005 |
| JP | 2005-331471 A | 12/2005 |
| JP | 2006-038600 | 2/2006 |

(Continued)

OTHER PUBLICATIONS

Google Patent Translation WO-2018168905: https://patents.google.com/patent/WO2018168905A1/en?oq=wo2018168905 obtained Aug. 17, 2024.*
International Search Report and Written Opinion dated Dec. 8, 2020 in PCT/JP2020/037536.
Ahern, Holly, "Biochemical, Reagent Kits Offer Scientists Good Return on Investment," The Scientist, 1995, 9(15):20, 5 pages.
English translation of JP2016102790 (Year: 2016).
Fujikura et al., JP2014232064A-Google translation (Year: 2014).
International Search Report dated Mar. 31, 2020 in PCT/JP2020/003064.
International Search Report dated Mar. 31, 2020 in PCT/JP2020/003065.

(Continued)

*Primary Examiner* — Oluwatosin A Ogunbiyi
(74) *Attorney, Agent, or Firm* — Foley & Lardner LLP

(57) ABSTRACT

This invention provides a method and an immunochromatographic device that enable measurement with sufficient sensitivity by performing nitrous acid extraction over a sufficiently long period of time in an immunochromatographic method comprising extracting a sugar chain antigen with nitrous acid and measuring the extracted sugar chain antigen on an immunochromatographic test strip. Such immunochromatographic device comprises a specimen dropping port on top of a sample pad of the test strip. The immunochromatographic device has: (i) a wide specimen dropping port to promote sugar chain antigen extraction with a nitrite and a solid acid reagent by retaining the added specimen sample solution and supplying the specimen sample solution to the region impregnated with the solid acid reagent or the nitrite within a short period of time; and (ii) no gaps between the dropping port and the sample pad so as to prevent the sample from leaking from the dropping port.

3 Claims, 8 Drawing Sheets

(56) References Cited

FOREIGN PATENT DOCUMENTS

| | | |
|---|---|---|
| JP | 2009-250763 A | 10/2009 |
| JP | 2012-168051 A | 9/2012 |
| JP | 2014-232064 A | 12/2014 |
| JP | 2015-034719 A | 2/2015 |
| JP | 2016-102790 A | 6/2016 |
| JP | 2016-125875 A | 7/2016 |
| JP | 2016-161329 A | 9/2016 |
| JP | 2016-211853 A | 12/2016 |
| JP | 2017-156324 A | 9/2017 |
| JP | 2018-151329 A | 9/2018 |
| JP | 2018-151330 A | 9/2018 |
| JP | 2018-151331 A1 | 9/2018 |
| JP | 2019-109091 A | 7/2019 |
| WO | WO-2005/121794 A1 | 12/2005 |
| WO | WO-2011/081075 A1 | 7/2011 |
| WO | WO-2017/010574 A1 | 1/2017 |
| WO | WO-2017/213228 A1 | 12/2017 |
| WO | WO-2018/168906 A1 | 9/2018 |
| WO | WO-2018/168907 A1 | 9/2018 |
| WO | WO-2018168905 A1 * | 9/2018 ......... G01N 33/5306 |

OTHER PUBLICATIONS

International Search Report dated Mar. 31, 2020 in PCT/JP2020/003066.
Merck Millipore (Rapid Lateral Flow Test Strips Considerations for Product Development; 2013).
Office Action and Search Report dated Apr. 22, 2022 in CN 201880018199.7.
Office Action and Search Report dated Apr. 8, 2022 in CN 201880018271.6.
Office Action dated Feb. 26, 2021 in Indian Patent Application No. 201947040682.
Office Action dated Sep. 29, 2021 in Indian Application No. 201947040709.
Supplementary European Search Report dated Nov. 9, 2020 in EP 18767950.1.
Supplementary European Search Report dated Nov. 9, 2020 in EP 18767951.9.
Supplementary European Search Report dated Oct. 26, 2020 in EP 18768581.3.
Yamada et al., JP2005-061910A Google translation (Year: 2005).
Zhang et al., "A stacking flow immunoassay for the detection of dengue-specific immunoglobulins in salivary fluid," Lab on a Chip, 2015, 15(6):1465-1471.

* cited by examiner

IMMUNOCHROMATOGRAPHIC DEVICE FOR EXTRACTING AND MEASURING SUGAR CHAIN ANTIGEN

CROSS-REFERENCE TO RELATED APPLICATIONS

This application is the U.S. National Stage of PCT/JP2020/037536, filed Oct. 2, 2020, which claims priority to JP 2019-184047, filed Oct. 4, 2019.

TECHNICAL FIELD

The present invention relates to an immunochromatographic device for extracting and measuring a sugar chain antigen, which is capable of extracting a sugar chain antigen with nitrous acid on an immunochromatographic test strip.

BACKGROUND ART

A majority of rapid diagnostic agents involving an immunochromatography method as a principle has been broadly used as a means for rapidly and simply measuring viral or bacterial infection and determining a treatment plan therefor.

In the case of such rapid diagnostic agents involving common immunochromatography method as a principle, a specimen is suspended in a specimen suspension, and the suspension is then supplied to an immunochromatographic test strip, so that the measurement can be carried out rapidly and simply.

For detection of microorganisms belonging to genus *Streptococcus*, such as group A β-hemolytic *Streptococcus* and intraoral *Streptococcus*, it is necessary to extract and measure sugar chain antigens.

For example, a method has been reported in which sodium nitrite and a neutralizing reagent are already included in an immunochromatographic test strip, so that a nitrous acid extraction treatment can be carried out on the immunochromatographic test strip simply through the operation of suspending a specimen in an acid solution such as acetic acid and supplying the suspension to the immunochromatographic test strip (Patent Literature 1).

In addition, a method has been reported in which an acid reagent and a neutralizing reagent have been already included in an immunochromatographic test strip, and a specimen is suspended in a nitrite and supplied to the immunochromatographic test strip.

In immunochromatography methods, it may be necessary to control the chromatography developmental speed on the immunochromatographic test strip. Immunochromatography methods performing such control in terms of a cassette configuration, a position of test strip components, a material used (e.g., a non-woven fabric or other material), a reagent, and the like are reported (Patent Literature 2 and Patent Literature 3).

CITATION LIST

Patent Literature

Patent Literature 1: International Publication WO 2005/121794
Patent Literature 2: JP Patent Publication No. 2005-331471 A
Patent Literature 3: JP Patent Publication No. 2005-331463 A

SUMMARY OF INVENTION

Technical Problem

Detection of microorganisms belonging to genus *Streptococcus*, such as group A β-hemolytic *Streptococcus* and intraoral *Streptococcus*, requires extraction and measurement of sugar chain antigens.

Extraction of sugar chain antigens requires the use of nitrous acid. Since nitrous acid is unstable by itself, extraction of antigens with nitrous acid is performed by mixing a nitrite solution with an acid solution (e.g., acetic acid, citric acid, or tartaric acid) at the time of use to generate nitrous acid.

When detecting group A β-hemolytic *Streptococcus* or the like via immunochromatography, an immunochromatographic test strip may be coated with either the nitrous acid solution or the acid solution, and the immunochromatographic test strip may then be dried, so as to impregnate the immunochromatographic test strip with the nitrous acid solution or the acid solution. In such a reagent form, it is not necessary to mix a reagent, and a procedure becomes simple, in comparison with a liquid reagent form. If a sample flows fast within the test strip as in the case of a conventional immunochromatography method, however, nitrous acid extraction is not sufficiently performed, and detection sensitivity becomes insufficient, disadvantageously.

In an embodiment in which a liquid reagent is mixed to perform nitrous acid extraction, in general, sample extraction is performed for 1 to 2 minutes. In order to achieve sensitivity equivalent to that achieved with the use of a liquid reagent, accordingly, it is necessary to hold a sample for 1 to 2 minutes in an upstream region where the sample on the immunochromatographic test strip is neutralized.

In contrast, there is a method involving the use of a pad made of a hydrophobic material and containing nitrous acid or an acid to perform extraction sufficiently. When the sample development becomes excessively slow, however, the sample cannot develop throughout the test strip within the reaction period of 5 minutes.

While such problems may be dissolved with the use of a pad made of a thicker material than a conventional immunochromatographic test strip, a gap may be created in a dropping port through which the specimen is added because of material thickness or flexibility, a sample to be extracted for 1 to 2 minutes may invade the cassette (vessel) through the dropping port, the sample may develop along the lateral surface of the test strip, and the reaction may not proceed normally (an acidic sample develops to the membrane remaining unneutralized, and a non-specific reaction occurs).

It is an object of the present invention to provide a method and an immunochromatographic device that enable detection with sufficient sensitivity by performing nitrous acid extraction over a sufficiently long period of time in an immunochromatography method comprising extracting and measuring sugar chain antigens via nitrous acid extraction on an immunochromatographic test strip.

Solution to Problem

The present inventors have conducted intensive studies regarding a technique of performing nitrous acid extraction over a sufficiently long period of time in an immunochromatography method for extracting and measuring sugar chain antigens that can extract a sugar chain antigen with nitrous acid on an immunochromatographic test strip.

As a result, they discovered that the above objects would be attained by providing a support having a protrusion that supports an immunochromatographic test strip of an immunochromatographic device with a slope, so as to control the developing time, thereby completing the present invention. Specifically, the present invention is as described below.

[1] An immunochromatographic device comprising an immunochromatographic test strip for extracting and measuring a sugar chain antigen in a specimen and a cassette for accommodating the test strip, wherein
the immunochromatographic test strip comprises a sample pad to which a specimen mixed with the nitrite or acid solution is added, a label region comprising a labeled antibody obtained by labeling an antibody that detects the sugar chain antigen, and a detection region on which the antibody that detects the sugar chain antigen is immobilized, an antibody-sugar chain antigen-labeled antibody complex is formed in the detection region to measure the sugar chain antigen, and the immunochromatographic test strip has a region impregnated with a neutralizing reagent upstream of the label region and further has, upstream of the region impregnated with the neutralizing reagent, a region impregnated with a solid acid reagent when the specimen mixed with the nitrite is used or a region impregnated with the nitrite when the specimen mixed with the acid solution is used.
the cassette is composed of an upper lid portion and a lower portion, the upper lid portion comprises an upper support having a protrusion that supports the upper side of the immunochromatographic test strip, and the lower cassette portion comprises a lower support comprising a protrusion that supports the lower side of the immunochromatographic test strip,
the immunochromatographic device comprises a specimen dropping port on top of a sample pad of the immunochromatographic test strip, and
the protrusions constituting the upper support and/or the lower support that support the immunochromatographic test strip are sloped.
[2] The immunochromatographic device according to [1], wherein the protrusions constituting the upper support and the lower support that support the immunochromatographic test strip are sloped.
[3] The immunochromatographic device according to [1] or [2], wherein the protrusion of the lower support of the immunochromatographic test strip is sloped toward the downstream side of the immunochromatographic test strip.
[4] The immunochromatographic device according to any of [1] to [3], wherein the protrusion of the upper support of the immunochromatographic test strip is sloped toward the downstream side of the immunochromatographic test strip.
[5] The immunochromatographic device according to any of [1] to [4], wherein the sugar chain antigen is a sugar chain antigen of protozoa, fungi, bacteria, mycoplasma, rickettsia, chlamydia, or virus.
[6] A method of measuring a sugar chain antigen in a specimen by promoting sugar chain antigen extraction by an immunochromatographic method using the immunochromatographic device according to any one of [1] to [5], comprising mixing the specimen with a nitrous acid solution when the immunochromatographic device has a region impregnated with a solid acid reagent, or mixing the specimen with an acid solution when the immunochromatographic device has a region impregnated with a nitrite, and adding the mixture to a sample pad of the immunochromatographic test strip, wherein
the sugar chain antigen is extracted from the specimen by the action of nitrous acid generated through a reaction of the nitrite with the solid acid reagent in the region impregnated with the solid acid reagent or the region impregnated with the nitrite, the acid solution containing the sugar chain antigen is neutralized in a region impregnated with a neutralizing reagent, and an antibody-sugar chain antigen-labeled antibody complex is formed in a detection region.

The present description includes the contents disclosed in Japanese Patent Application No. 2019-184047, which is a priority document of the present application.

Advantageous Effects of Invention

With the use of the immunochromatographic device according to the present invention, the time during which the specimen sample solution flows on the immunochromatographic test strip after the addition of the sample can be adequately controlled. As a result, treatment of the specimen can be sufficiently performed on the immunochromatographic test strip with the aid of a reagent for specimen treatment that has impregnated the immunochromatographic test strip.

DESCRIPTION OF EMBODIMENTS

Figure 1:
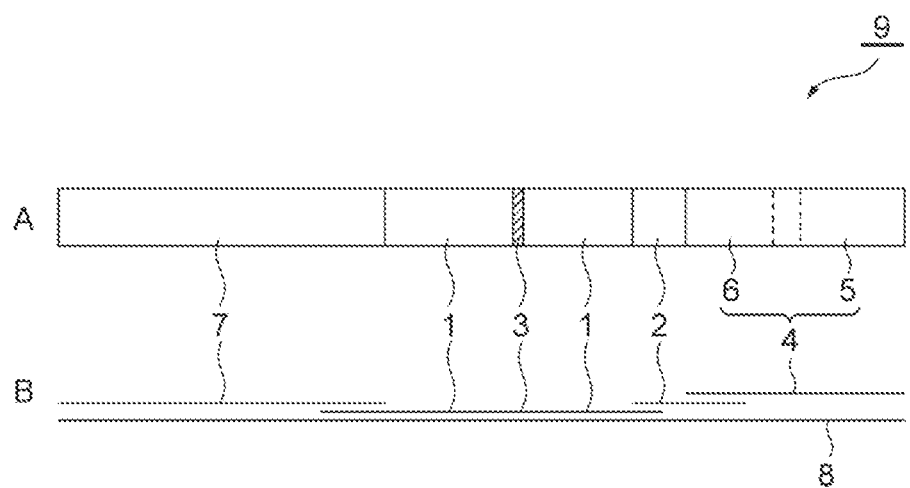
FIG. 1 is a schematic figure showing a structure of an immunochromatographic test strip (single-pad test strip) having a solid acid reagent region and a neutralizing reagent region.

Hereafter, the present invention will be described in detail.

The present invention relates to an immunochromatographic device, which simplifies nitrous acid extraction treatment of a sugar chain antigen so as to carry out the treatment on an immunochromatographic test strip and enables rapid and accurate detection of the sugar chain antigen as an analyte to be detected. An immunochromatographic device comprises an immunochromatographic test strip and a cassette accommodating the same, and such a device can be prepared by integrating an immunochromatographic test strip into an immunochromatographic cassette. The storing cassette can prevent the degradation of the test strip, which is caused by, for example, ultraviolet rays or moisture contained in the air. Moreover, in the case of treating a specimen sample having contamination or infectivity, such a storing cassette can prevent a user performing an assay from being contaminated or infected with the specimen or the sample. For instance, a resin-made case having a suitable size may be used as a storing cassette, and the chromatographic test strip may be accommodated in the case. Alternatively, the surface of a test strip having an antigen or an antibody immobilized thereon may be coated with a resin-made film or the like (top laminate tape).

An immunochromatographic test strip comprises: a support having a detection region with an immobilized antibody (Antibody 1) that captures an analyte to be detected (antigen, etc.); a label region having a free labeled antibody (Antibody 2); a sample pad to which a specimen is added; an absorption band that absorbs a developed specimen solution; a backing sheet for adhering these material items to one another; and the like.

It is to be noted that the number of detection regions and the type of a labeled antibody contained in the label region are not limited to one, and that, by using antibodies corresponding to a plurality of analytes to be detected, two or more antigens can be measured on a single test strip.

The support is a material having the property of immobilizing an antibody used to capture an analyte to be detected (an antigen), and also, it does not prevent the movement of a liquid in the horizontal direction. Preferably, the support is a porous thin film (membrane) having a capillary action, and is a material capable of transporting a liquid and components dispersed therein according to absorption. The material used for the support is not particularly limited, and examples thereof include cellulose, nitrocellulose, cellulose acetate, polyvinylidene difluoride (PVDF), glass fiber, nylon, and polyketone. Among these materials, a thin film or a membrane of nitrocellulose is more preferable. A membrane having an antibody immobilized thereon is referred to as an antibody-immobilized membrane.

The label region is composed of a porous substrate comprising a labeled antibody, and a commonly used glass fiber, non-woven fabric, and the like can be used herein as a material for the substrate. The substrate is preferably a pad having a thickness of approximately 0.3 mm to 0.6 mm, in order that the substrate is impregnated with a large amount of a labeled antibody. A porous substrate that is impregnated with a labeled antibody and then dried is also referred to as a dry pad.

For the labeling of an antibody, enzymes such as alkaline phosphatase or horse radish peroxidase, metal colloids such as gold colloids, silica particles, cellulose particles, colored polystyrene particles, colored latex particles, etc. are used in many cases. When metal colloidal particles or colored particles such as colored polystyrene particles or colored latex particles are used, color is developed by aggregation of these labeling reagents. So, the thus developed color is measured. Particles having antibodies immobilized thereon are referred to as antibody-immobilized particles.

The detection region indicates a region of the support, on which an antibody used to capture an analyte to be detected (an antigen) is immobilized. In the detection region, at least one region, on which an antibody used to capture an antigen is immobilized, is provided. The detection region may be comprised in the support, and an antibody may be immobilized on the support.

The sample pad is a site to which a specimen is added, and is a porous material. The sample pad is located in the uppermost stream site of the immunochromatographic test strip. As a material for the sample pad, a commonly used filter paper, glass fiber, non-woven fabric, etc. can be used. In order to use a large amount of specimens in immunoassay, the sample pad preferably has a thickness of approximately 0.3 mm to 1 mm. The specimen also includes a sample prepared using the specimen, such as a sample obtained by suspending the specimen in another solution.

The absorbent pad is a component for absorbing leftover specimens, which are supplied to the support but are not associated with the reaction in the detection region. As a material for the absorbent pad, a highly water-retainable filter paper, sponge or the like, composed of a common natural polymer, a synthetic polymer or the like can be used. In order to promote the development of a specimen, a highly water-absorbable material is preferably used.

The backing sheet is a component used for adhesion and/or fixation of all of the aforementioned materials, namely, the support, the sample pad, the label region, the absorbent pad and the like, in which these materials are partially overlapped with one another. The backing sheet is not always needed, as long as these materials are arranged and fixed with optimal intervals. However, it is generally preferred to use a backing sheet for convenience of production or use.

In the immunochromatographic test strip of the present invention, a control display region (or such a material) may be further present. The control display region is a site showing that a test is accurately carried out. For example, the control display region is located downstream of the detection region, and emits signals by means of coloration, when a specimen sample passes through the detection region and reaches the control display region. In the control display region, a substance capable of binding to a labeled carrier-bound antibody may be immobilized, or a reagent such as a pH indicator, which changes its color upon arrival of a specimen, may be immobilized. When such a labeled carrier-bound antibody is a mouse monoclonal antibody, an anti-mouse IgG antibody may be used.

The size of an immunochromatographic test strip is not limited. For example, the longitudinal length thereof is from several to more than 10 centimeters and the lateral length thereof is from about several millimeters to several centimeters.

In the test strip of the above-described embodiment, the specimen passes through porous flow channels formed by connecting a series of materials, such as the sample pad, the label region, the support, the detection region, and the absorption band, with one another. Thus, in this embodiment, all of these components serve as a specimen flowing region. There may be an embodiment wherein a specimen moves on an interface without penetrating an interior of a material depending on the quality or form of each component material. However, since the specimen flowing region defined in the present description can be an interior or an interface, a test strip of such an embodiment is also included in the scope of the present description.

In the case of measuring a sugar chain antigen in a specimen using the immunochromatographic test strip of the present invention, it is necessary to first extract the sugar chain antigen in the specimen. The extraction of the sugar chain antigen is performed by treating the specimen containing the sugar chain antigen with nitrous acid. The nitrous acid can be generated by mixing a nitrite such as sodium nitrite with an acid, and the specimen containing the sugar chain antigen may be treated with the nitrous acid thus generated. The extracted antigen binds through an antigen-antibody reaction to the antibody immobilized on the immunochromatographic test strip. On this occasion, if an acid remains in the reaction system, the reaction system becomes acidic and the antigen-antibody reaction is inhibited. Thus, it is necessary to neutralize the acid in the reaction system.

In the method of measuring a sugar chain antigen by mixing a nitrite with an acid to generate nitrous acid, extracting the sugar chain antigen from a specimen with the nitrous acid, neutralizing the nitrous acid, and then allowing the sugar chain antigen to bind to the antibody immobilized on the immunochromatographic test strip, in the present invention, examples of the method of extracting and measuring a sugar chain antigen include the following methods. In any of the methods, the extraction of the sugar chain antigen with nitrous acid and the neutralization are performed on the immunochromatographic test strip. In order to perform the extraction of the sugar chain antigen with nitrous acid on the immunochromatographic test strip, the immunochromatographic test strip may be impregnated with an acid reagent or a nitrite. In order to perform the neutralization on the immunochromatographic test strip, the immunochromatographic test strip may be impregnated with a neutralizing reagent.

(A) A specimen is mixed with an acid solution prior to addition of the mixture to a sample pad of the immunochromatographic test strip impregnated with a nitrite and a neutralizing reagent. When the mixture arrives at the region impregnated with the nitrite, the nitrite reacts with the acid to generate nitrous acid, so that a sugar chain antigen in the specimen is extracted. The extract of the sugar chain antigen is neutralized in the region impregnated with the neutralizing reagent on the immunochromatographic test strip, and the sugar chain antigen binds to the antibody immobilized on the immunochromatographic test strip and can thus be detected. In this method, examples of the acid solution to be used include acetic acid, hydrochloric acid, malonic acid, malic acid, maleic acid, citric acid, and tartaric acid.

(B) A specimen is mixed with a nitrite solution prior to addition of the mixture to a sample pad of the immunochromatographic test strip impregnated with an acid reagent and a neutralizing reagent. When the mixture arrives at the region impregnated with the acid reagent, the nitrite reacts with the acid to generate nitrous acid, so that a sugar chain antigen in the specimen is extracted. The extract of the sugar chain antigen is neutralized in the region impregnated with the neutralizing reagent on the immunochromatographic test strip, and the sugar chain antigen binds to the antibody immobilized on the immunochromatographic test strip and can thus be detected.

The immunochromatographic test strip of the present invention for performing the above-described method (A) or (B) is impregnated with the acid reagent or the nitrate and the neutralizing reagent in a region upstream from the label region (on the upstream side along the development of the specimen, where the sample pad is present), namely, within the sample pad or between the sample pad and the label region. The immunochromatographic test strip impregnated with the nitrite and the neutralizing reagent within the sample pad or between the sample pad and the label region can be used for the above-described method (A). In addition, an immunochromatographic test strip impregnated with the acid reagent and the neutralizing reagent within the sample pad or between the sample pad and the label region can be used for the above-described method (B). As the acid reagent to impregnate the immunochromatographic test strip, a solid acid reagent is used. According to these methods, an analyte to be detected in a test sample can be accurately and specifically measured, regardless of the amount of the test sample to be tested.

The solid acid reagent or the nitrite may be allowed to impregnate the sample pad or may be allowed to impregnate a pad made of a porous material such as a non-woven fabric, which is different from the sample pad, and the obtained solid acid reagent-impregnated porous material or nitrite-impregnated porous material may be disposed between the sample pad and the label region, namely, on the side upstream of the label region. In the above, the region impregnated with the solid acid reagent or the nitrite may or may not make contact with the sample pad or the label region. In the present invention, the region impregnated with a reagent is also referred to as a pad impregnated with a reagent.

The neutralizing reagent is disposed downstream of the region impregnated with the solid acid reagent or the nitrite. The neutralizing reagent may be allowed to impregnate the sample pad or the support. Alternatively, it may be allowed to impregnate a pad made of a porous material such as a non-woven fabric, which is different from the support, and the obtained neutralizing reagent-impregnated porous material may be disposed between the region impregnated with the solid acid reagent or the nitrite and the label region. That is, a region impregnated with a neutralizing reagent is provided upstream of the label region, and further a region impregnated with a solid acid reagent or a nitrite is provided upstream of the region impregnated with the neutralizing reagent. In the above, the region impregnated with the neutralizing reagent may or may not make contact with the region impregnated with the solid acid reagent or the nitrite or the label region.

The region impregnated with a solid acid reagent is referred to as a solid acid reagent region, the region impregnated with a nitrite is referred to as a nitrite region, and the region impregnated with a neutralizing reagent is referred to as a neutralizing reagent region or a basic reagent region.

The immunochromatographic test strip having a solid acid reagent region or a nitrite region and a neutralizing reagent region has, on the support, a sample pad, a solid acid reagent region or a nitrite region, a neutralizing reagent region, a label region, a detection region, and an absorption band, from the upstream thereof, and the solid acid reagent region or the nitrite region may be located on the sample pad. Moreover, the sample pad, the solid acid reagent region or the nitrite region, the neutralizing reagent region, the label region, the detection region, and the absorbent pad may or may not make contact with a region adjacent thereto. In addition, it is not necessary that the solid acid reagent region or the nitrite region, the neutralizing reagent region, and the label region impregnate separate porous materials. A plurality of or all such regions may impregnate the same porous material.

The solid acid reagent to be used in the present invention is in a solid state at room temperature and does not volatilize at high temperature.

Examples of the solid acid reagent that is preferably used in the present invention include malonic acid, malic acid, maleic acid, citric acid, and tartaric acid.

If an acid with a higher valence, for example, citric acid, is used as a preferred solid acid reagent in the present invention, extraction can be performed with a smaller amount of acid. On the other hand, if acids have the same valence, an acid having a smaller acid dissociation constant, such as maleic acid or tartaric acid, is more efficient.

Also, as a preferred solid acid reagent to be used in the present invention, a reagent that is not colored on the immunochromatographic test strip, and more specifically, preferred is a reagent, which is white in a dry state or is hardly colored by dry heat or oxidation.

Examples of the nitrite to be used in the present invention include sodium nitrite and potassium nitrite.

The amount of the solid acid reagent or the nitrite to be used in the present invention, namely, the amount of the solid acid reagent or the nitrite to impregnate the immunochromatographic test strip is not particularly limited. In general, the amount thereof is approximately 0.01 μg to 1 mg, and is preferably approximately 0.1 μg to 0.1 mg, with respect to a single immunochromatographic test strip. It is preferable to determine the optimal amount to exert effects in accordance with, for example, the type of the solid acid reagent or the nitrite to be used, the composition of the specimen suspension, or the amount thereof to be added.

In order to impregnate a sample pad or a porous material with the solid acid reagent or the nitrite, the solid acid reagent or the nitrite is once dissolved, applied, and then dried.

The neutralizing reagent used in the present invention is in a solid state at room temperature and does not volatilize at high temperature.

Examples of preferred neutralizing reagents to be used in the present invention include Tris base (tris(hydroxymethyl)aminomethane), sodium hydroxide, dipotassium hydrogen phosphate, trisodium citrate, and Good's buffers having a buffering ability in the alkaline range.

The amount of the neutralizing reagent to be used in the present invention, namely, the amount thereof to impregnate the immunochromatographic test strip is not particularly limited. In general, the amount thereof is approximately 0.01 μg to 1 mg, and preferably approximately 0.1 μg to 0.1 mg, with respect to a single immunochromatographic test strip. It is preferable to determine the optimal amount to exert effects in accordance with, for example, the type of the neutralizing reagent to be used, the composition of the specimen suspension, or the amount thereof to be added.

In order to impregnate a sample pad or porous material with a neutralizing reagent, the neutralizing reagent may be once dissolved, the solution may be applied to the sample pad or porous material, and the resulting sample pad or porous material may then be dried.

Figure 2:
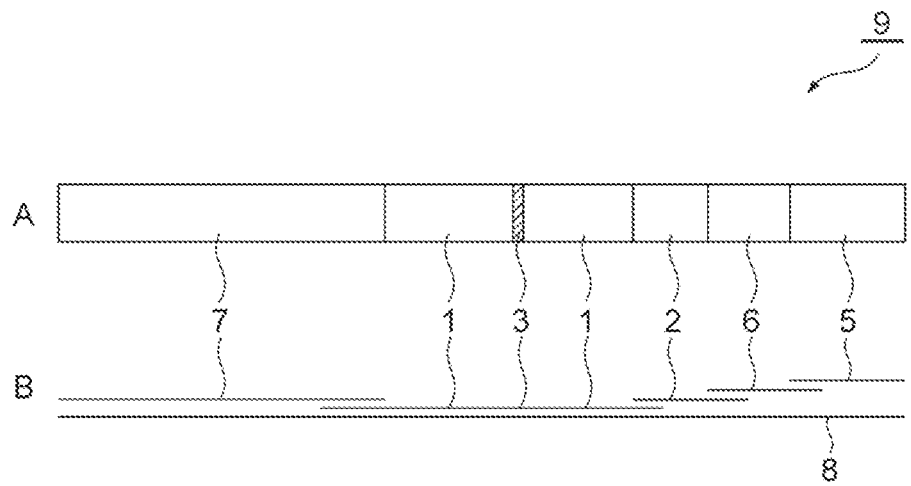
FIG. 2 is a schematic figure showing a structure of an immunochromatographic test strip (dual-pad test strip) having a solid acid reagent region and a neutralizing reagent region.
Figure 3:
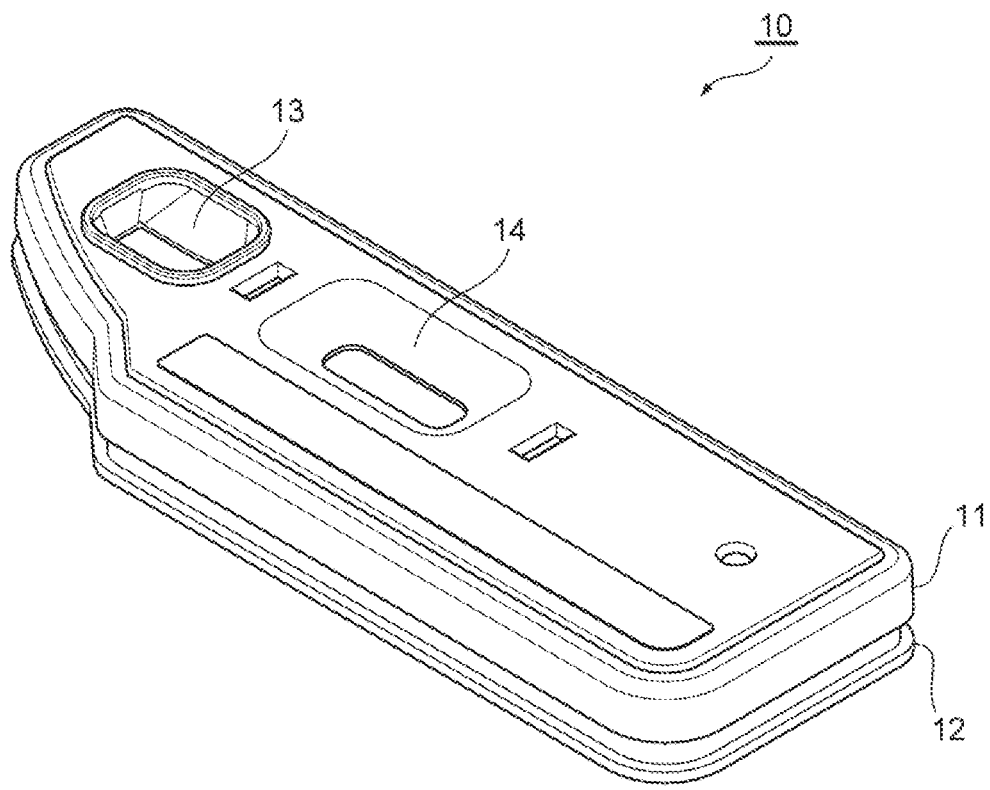
FIG. 3 is a perspective figure showing an exterior of a storing cassette of an immunochromatographic device.
Figure 4:
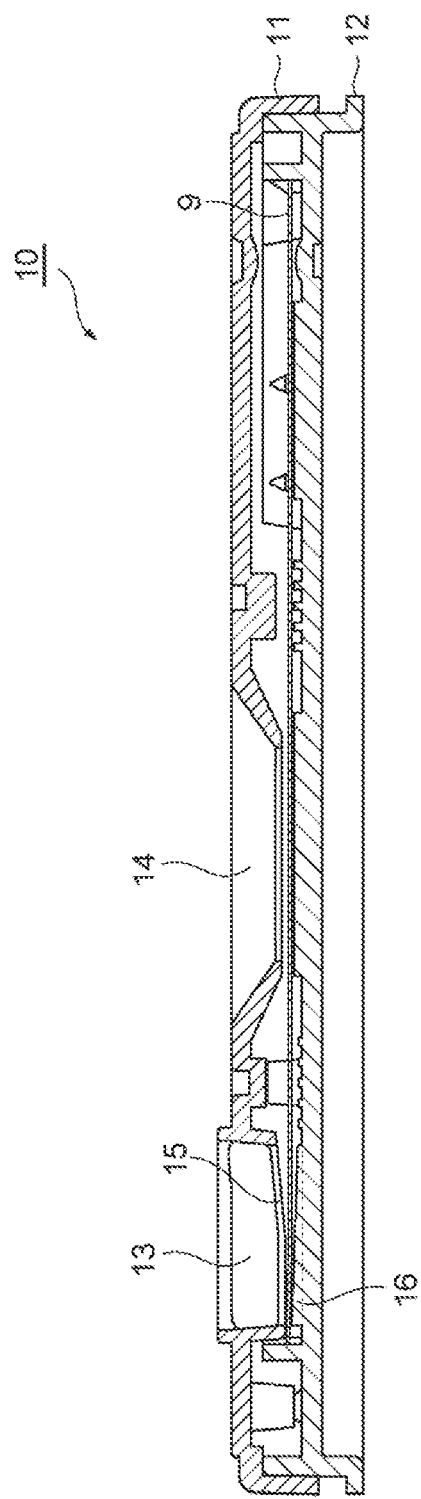
FIG. 4 is a cross-sectional figure showing a storing cassette of an immunochromatographic device.
Figure 5:
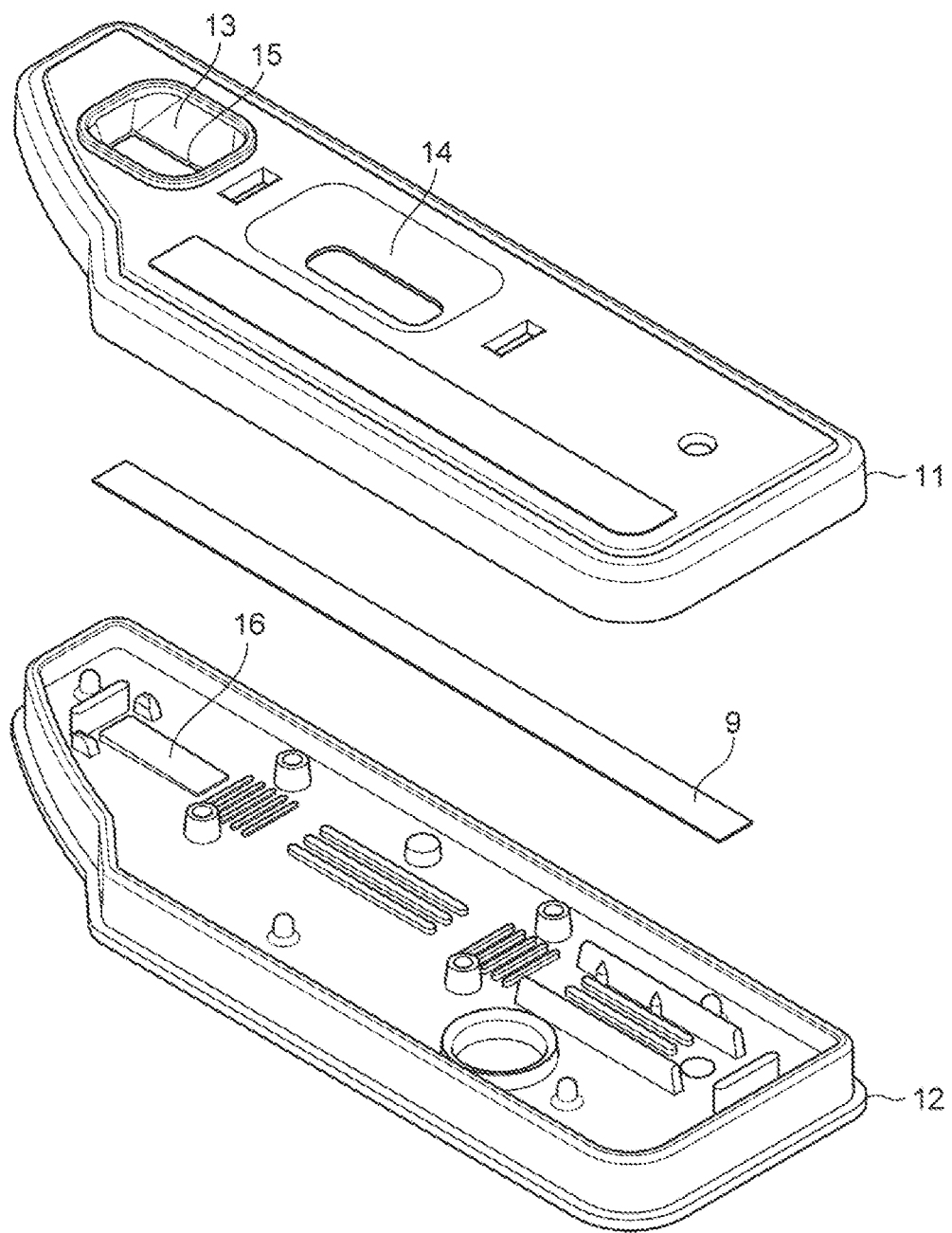
FIG. 5 is a perspective figure showing a lid portion of a storing cassette of an immunochromatographic device, an immunochromatographic test strip, and a lower portion of a storing cassette.
Figure 6:
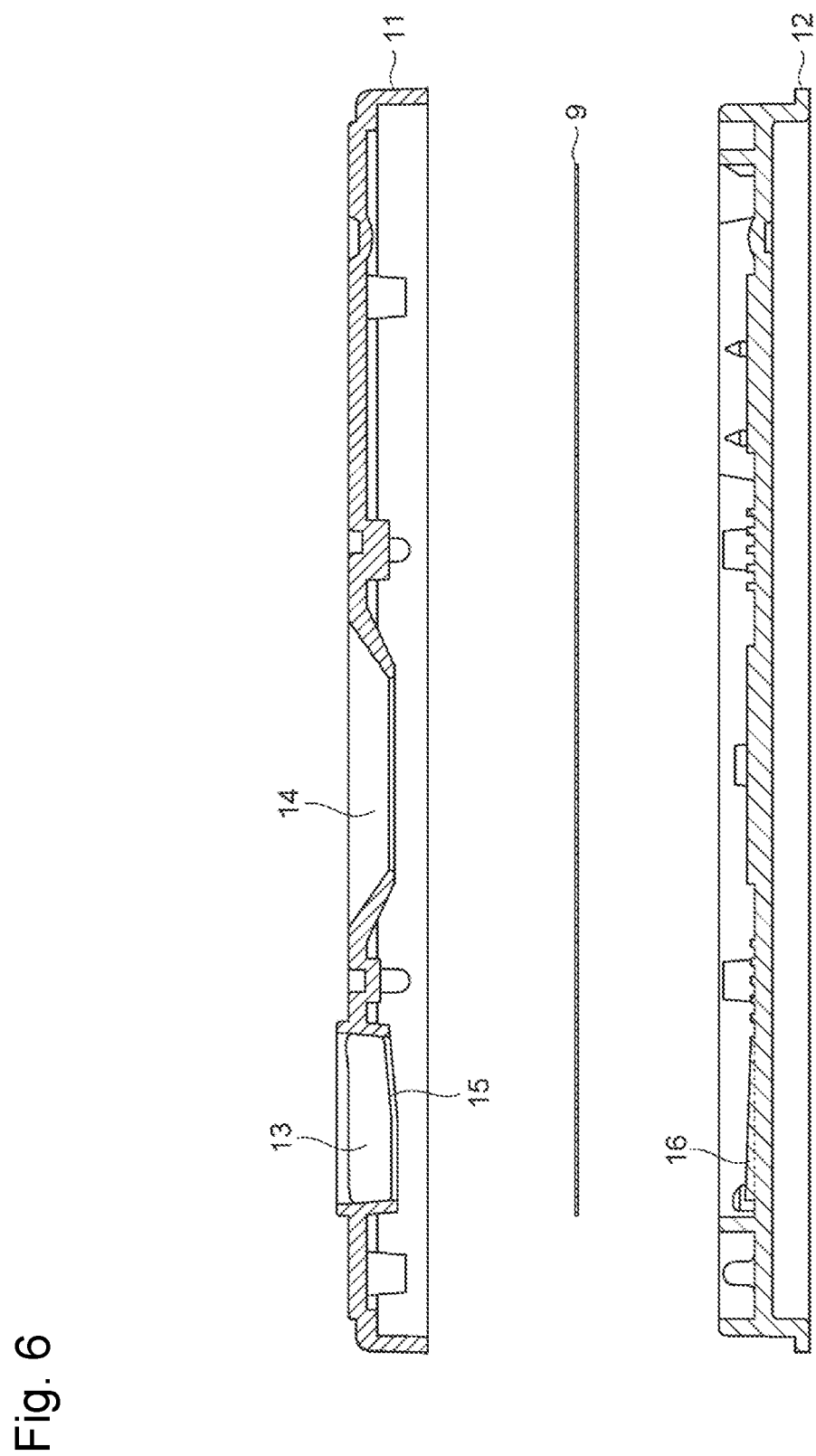
FIG. 6 is a cross-sectional figure showing a lid portion of a storing cassette of an immunochromatographic device, an immunochromatographic test strip, and a lower portion of a storing cassette.
Figure 7:
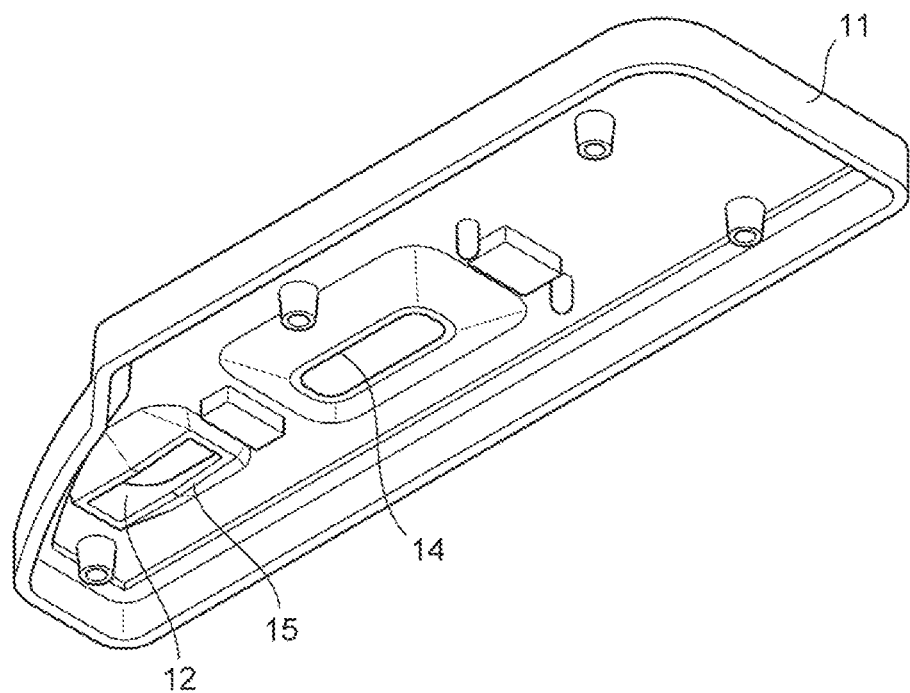
FIG. 7 is a perspective figure showing a lid portion of a storing cassette of an immunochromatographic device.
Figure 8:
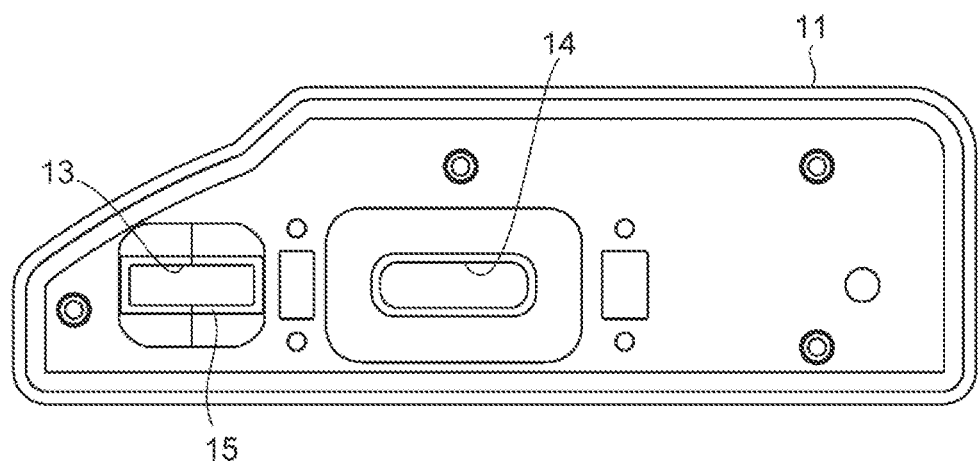
FIG. 8 is a plan figure showing a lid portion and a lower portion of a storing cassette of an immunochromatographic device.
Figure 8:
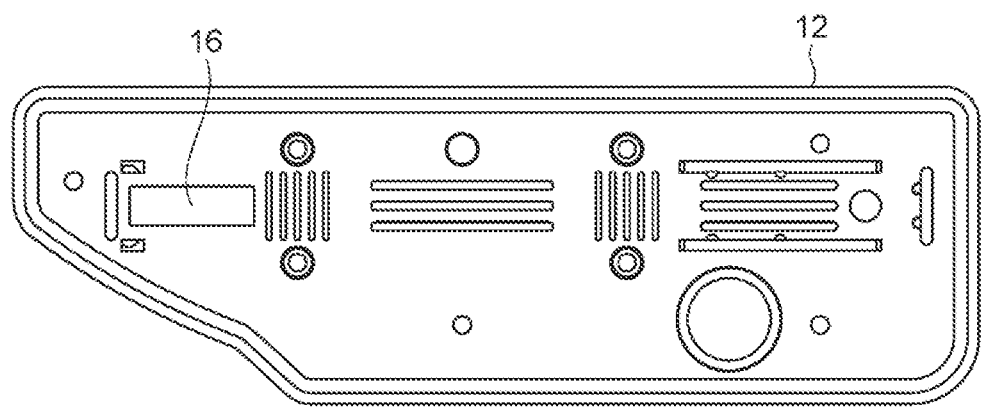

FIGS. 1 and 2 each show one preferred embodiment of a typical immunochromatographic test strip. The immunochromatographic test strip shown in FIGS. 1 and 2 is each an immunochromatographic test strip impregnated with a solid acid reagent and a neutralizing reagent, and such immunochromatographic test strip may be impregnated with a nitrite instead of the solid acid reagent. In such a case, the resulting immunochromatographic test strip is impregnated with a nitrite and a neutralizing reagent. Those skilled in the art can appropriately design and produce an immunochromatographic test strip impregnated with a nitrite and a neutralizing reagent. It should be noted that the immunochromatographic test strip is not limited to those shown in FIGS. 1 and 2. In FIGS. 1 and 2, reference numeral 1 denotes a support, reference numeral 2 denotes a label region, reference numeral 3 denotes a detection region, reference numeral 4 denotes a sample pad, reference numeral 7 denotes an absorbent pad, and reference numeral 8 denotes a backing sheet. A top laminate tape may be adhered to the entire test strip.

FIG. 1A and FIG. 2A are each a top view and FIG. 1B and FIG. 2B are each a cross-sectional view. In the example shown in FIG. 1, a support 1 comprising a detection region 3 formed thereon, an absorbent pad 7, a label region 2, a sample pad 4, and the like are laminated on a backing sheet 8 made of resin etc. As shown in FIG. 1, an end of the absorbent pad 7 overlaps with an end of the support 1, the other end of the support 1 overlaps with an end of the label region 2, and the other end of the label region 2 overlaps with one end of the sample pad 4. An upstream region of the sample pad 4 is impregnated with the solid acid reagent, and a downstream region of the sample pad with a small distance from the aforementioned upstream region is impregnated with a neutralizing reagent. The region impregnated with a solid acid reagent is referred to as a solid acid reagent region 5, and the region impregnated with a neutralizing reagent is referred to as a neutralizing reagent region 6. In the test strip shown in FIG. 1, the sample pad 4 also serves as the solid acid reagent region 5 and the neutralizing reagent region 6. That is, the solid acid reagent region and the neutralizing reagent region are present on the sample pad. This test strip comprises the solid acid reagent region and the neutralizing reagent region provided on a porous material (pad), and, thus, it may also be referred to as a single-pad test strip. In the example shown in FIG. 2, the solid acid reagent region 5 and/or the neutralizing reagent region 6 are present upstream of the label region 2, and these regions overlap with each other, so that continuous lateral flow channels are formed. In the test strip shown in FIG. 2, the solid acid reagent region 5 also serves as a sample pad. That is, the solid acid reagent region is present on the sample pad. This test strip comprises the solid acid reagent region and the neutralizing reagent region provided on two separate porous materials (pads), and, thus, it is also referred to as a dual-pad test strip. A sample pad may further be present upstream of the solid acid reagent region. In the test strip shown in FIG. 2, the solid acid reagent region 5 and the neutralizing reagent region 6 impregnate different porous materials. As in the case of the sample pad of the test strip shown in FIG. 1, the solid acid reagent region 5 and the neutralizing reagent region 6 may be provided upstream and downstream of the same porous materials (pad), respectively.

The immunochromatographic test strip is accommodated in a storing cassette and used as an immunochromatographic device. That is, an immunochromatographic device comprises a storing cassette and an immunochromatographic test strip integrated in the storing cassette. In general, the storing cassette is composed of a lower vessel portion and an upper lid portion. The immunochromatographic test strip is accommodated in the lower cassette portion, and the upper lid portion is provided on top of the lower cassette portion when an immunochromatography test is performed. The lower cassette portion and the upper lid portion may be simply referred to as the lower portion and the upper portion of the storing cassette, respectively, according to need. When the immunochromatographic test strip is accommodated in the storing cassette, a specimen dropping port that can supply a specimen sample solution to the sample pad is provided on the sample pad. When the specimen is added through the specimen dropping port to the cassette, the specimen impregnates the sample pad. The "dropping port" may also be referred to as an "addition port." When the immunochromatographic test strip is accommodated in the storing cassette, also, a judgement section is positioned on top of the detection region. Thus, the detection region can be observed through the hole of the judgement section of the cassette.

When the lower cassette portion is covered by the upper lid portion, the immunochromatographic test strip accommodated in the lower cassette portion is sandwiched between the protrusions provided in the upper lid portion and in the lower cassette portion of the storing cassette. Thus, the immunochromatographic test strip is immobilized and supported. Accordingly, the protrusions provided in the upper lid portion and in the lower cassette portion of the storing cassette are referred to as the upper support having a protrusion and the lower support having a protrusion, respectively.

The upper support of the upper lid portion is provided to form an edge of an opening on the side of the dropping port opposite from the side to which the specimen is added, and the upper support of the upper lid portion is formed of a sloped protrusion. The upper support of the upper lid portion supports the upper side of the sample pad of the immunochromatographic test strip. When the upper support of the upper lid portion pushes the upper side of the sample pad of the immunochromatographic test strip in a downward direction, the height of the protrusion becomes smaller toward the downstream side of the immunochromatographic test strip. That is, the protrusion has an increasing slope toward the downstream side of the immunochromatographic test strip. When the lower cassette is covered by the upper lid portion, the upper side of the sample pad of the immunochromatographic test strip is pushed in a downward direction to immobilize the sample pad, the upper lid portion is brought into close contact with the sample pad so as to prevent the specimen solution from leaking from the sample pad. When the upper support of the upper lid portion pushes the sample pad, the pressure becomes lower in a downward direction. The support may be referred to as a "support with a sloped protrusion."

In contrast, an upper support of an upper lid portion of a storing cassette of a conventional immunochromatographic device is not sloped, and it has a flat configuration.

The lower support of the lower cassette portion is formed of a sloped protrusion provided in a region corresponding to the specimen dropping port of the lower cassette portion. The term "a region corresponding to the specimen dropping port of the lower cassette portion" used herein refers to a region overlapping with the opening of the specimen dropping port when the lower cassette portion is covered by the upper lid portion. The lower support of the lower cassette portion supports the lower side of the sample pad of the immunochromatographic test strip when the lower cassette portion is covered by the upper lid portion. The lower support of the lower cassette portion pushes the lower side of the sample pad of the immunochromatographic test strip in an upward direction to immobilize the sample pad. The lower support is provided as a sloped protrusion in a region corresponding to the specimen dropping port. When the lower support pushes the sample pad of the immunochromatographic test strip, the height of the protrusion becomes smaller toward the downstream side of the immunochromatographic test strip. That is, the protrusion has a decreasing slope toward the downstream side of the immunochromatographic test strip, and the pressure to push the sample pad becomes lower in a downward direction. The support may be referred to as a "support with a sloped protrusion."

In contrast, a lower support of a lower part of a storing cassette of a conventional immunochromatographic device is not sloped, and it has a flat configuration.

A lid portion with a support comprising a protrusion with an increasing slope in a downstream direction of the immunochromatographic test strip that supports the immunochromatographic test strip by pushing the upper side thereof can be referred to as a "lid portion with an sloped upper support," a cassette portion comprising a support having a protrusion with a decreasing slope in a downward direction of the immunochromatographic test strip that supports the immunochromatographic test strip by pushing the lower side thereof can be referred to as a "cassette portion with an sloped lower support," a lid portion without a support with a sloped protrusion can be referred to as a "conventional lid portion," and a cassette portion without a support with a sloped protrusion can be referred to as a "conventional cassette portion." Examples of the combination of the upper lid portion and the lower portion of the storing cassette of the immunochromatographic device according to the present invention include the following A to C:

A: a lid portion with a sloped upper support and a conventional cassette portion;
B: a lid portion with a sloped upper support and a cassette portion with an sloped lower support; and
C: a conventional lid portion and a cassette portion with a sloped lower support.

In the immunochromatographic device according to the present invention, a support with a sloped protrusion may be present in each of the upper lid portion and the lower portion of the storing cassette of the immunochromatographic device as described in B above or either of the upper lid portion or the lower cassette portion as described in A and C above. It is preferable that a support with a sloped protrusion be present in each of the upper lid portion and the lower cassette portion as described in B above.

As described above, a support portion of the upper lid portion and/or the lower cassette portion that is in contact with the sample pad of the immunochromatographic test strip has a protrusion with a decreasing slope in a downward direction of the immunochromatographic test strip. When the sample pad of the immunochromatographic test strip is sandwiched and pushed by the upper support and the lower support, accordingly, the upper support and the lower support are brought into close contact with the immunochromatographic test strip, and a pressure in a downstream region becomes lower than a pressure in an upstream region. Thus, the added liquid specimen would not leak from the immunochromatographic test strip, and a fluid flow channel on a downstream side of the sample pad of the immunochromatographic test strip would not be tightly pushed by the support. Thus, the liquid specimen would easily flow. In addition, the upstream region of the sample pad is present in a position higher than the downstream region, and the liquid specimen would easily flow because of the gravity. As a result, the time at which development of the specimen would be initiated can be adequately regulated, so that the highest detection sensitivity can be obtained within the designated time of judgment.

The immunochromatographic device according to the present invention comprises the support with a sloped protrusion in the storing cassette of the immunochromatographic test strip. In the immunochromatographic method for extracting and measuring a sugar chain antigen capable of extracting a sugar chain antigen with nitrous acid on an immunochromatographic test strip, accordingly, the flow speed of the sample can be adequately controlled. The immunochromatographic device according to the present invention may further have structural features concerning the mechanism of controlling the developing speed of specimen samples described below.

(1) The immunochromatographic device according to the present invention may be provided with a wide dropping port.

For example, a dropping port of a conventional immunochromatographic device (Quick Navi™-Strep A, Denka Company Limited) accommodating an immunochromatographic test strip with a longitudinal length of 5 to 9 cm, and preferably 7 cm, and a lateral length of 0.3 to 0.7 cm, and preferably 0.5 cm, is provided as an approximately rectangular dropping port with a size of approximately 3.5 mm×approximately 5.5 mm (19.25 $mm^2$). In contrast, a dropping port of the immunochromatographic device according to the present invention accommodating an immunochromatographic test strip of the same size is provided as an approximately rectangular dropping port with a size of approximately 3.5 mm×approximately 11 mm (38.5 $mm^2$). Since the sizes of the immunochromatographic device and of the immunochromatographic test strip accommodated therein are approximately equivalent, the immunochromatographic device with a lateral length of 3 cm and a longitudinal length of 9 cm comprising an approximately rectangular dropping port with a size of 3 to 5 mm×8 to 15 mm (24 to 75 $mm^2$) is an immunochromatographic device with a wide dropping port, and such device can exert the effects of the immunochromatographic device according to the present invention. A longer side of the dropping port is parallel to a longer side of a chromatographic test strip. That is, it is along the flow direction of a specimen sample solution. A longer side length of the dropping port may be referred to as a dropping port length, and a shorter side length thereof may be referred to as a dropping port width. While the example described above concerns an approximately rectangular dropping port, a dropping port configuration may be a triangle or circle. When the size of the dropping port of the immunochromatographic device according to the present invention is represented in terms of the area, it is 24 to 75 $mm^2$, and preferably 35 to 75 $mm^2$.

For example, the immunochromatographic device according to the present invention accommodates an immunochromatographic test strip with a longitudinal length of 5 to 9 cm and a lateral length of 0.3 to 0.7 cm and comprises an approximately rectangular dropping port with a size of 3 to 5 mm (dropping port width)×8 to 15 mm (dropping port length) (24 to 75 $mm^2$). A dropping port length is preferably 10 mm or longer, and more preferably 10 mm. A device with a dropping port length of less than 8 mm (e.g., 5 mm) is a conventional device with a narrow dropping port.

When a specimen was treated with a specimen-treating reagent provided on an immunochromatographic test strip according to a conventional immunochromatographic method, an area where the sample solution was in contact with a region impregnated with the specimen-treating reagent was small, and the capacity for specimen treatment was accordingly low. In addition, specimen treatment was performed by allowing the sample solution to gradually develop on the immunochromatographic test strip, and a difference was caused in the concentration of the specimen-treating reagent between the sample solution that was developed in the beginning and the sample solution that was developed later. Accordingly, it was impossible to accurately treat specimens.

The immunochromatographic device according to the present invention comprises a wide dropping port. Thus, a large quantity of a specimen sample solution can be simultaneously supplied to a region impregnated with a specimen-treating reagent, i.e., a region impregnated with a solid acid reagent or a region impregnated with nitrous acid, on an immunochromatographic test strip within a short period of time. As a consequence, sugar chain antigen extraction on the immunochromatographic test strip can be promoted. The amount of the specimen sample solution that can be simultaneously supplied is 10 µl to 200 µl.

As a result, no differences would arise in the specimen-treating reagent concentration because of the temporal difference. Thus, specimen treatment performed on an immunochromatographic test strip can be promoted and performed in an accurate and efficient manner.

(2) The immunochromatographic device according to the present invention may be constituted to have no gap between the dropping port and the sample pad positioned underneath thereof, so as to prevent the sample from leaking from the dropping port.

The immunochromatographic device according to the present invention comprises a wide dropping port, and a large quantity of a specimen sample solution is supplied simultaneously. The peripheral portion as an exterior outline of the dropping port has a given height (1 to 5 mm), and the supplied specimen sample solution is reserved once within the dropping port.

As a result, it would take a while until all the specimen sample solution would be absorbed by the immunochromatographic test strip. In some cases, thus, the sample solution was not absorbed by the immunochromatographic test strip, and the sample solution leaked from the immunochromatographic test strip.

The immunochromatographic device of the present invention can be constituted as described below. That is, the sample pad is supported with the backing sheet with an exterior outline size equivalent to or larger than that of the dropping port, so as to prevent the sample from leaking from the dropping port. Thus, the backing sheet can push the sample pad against the dropping port, and no gap is generated between the dropping port and the sample pad. This can prevent the sample solution from leaking.

When a sample pad thickness is uneven, a gap is likely to be generated between the sample pad and the dropping port in a region where a sample pad is thin. Thus, leaking of a sample solution is likely to occur.

In the present invention, the cassette base of the device may be designed to be high in a region where the sample pad is thin, and it may be designed to be low in a region where the sample pad is thick. Thus, the device can be constituted to have no gap between the dropping port and the pad even when a pad thickness is uneven. This can prevent the sample solution from leaking.

As a consequence, sugar chain antigen extraction on the immunochromatographic test strip can be efficiently performed.

(3) Highly hydrophobic materials (non-woven fabric materials) may be selected when producing pads of immunochromatographic test strips to be impregnated with a solid acid reagent or a specimen-treating reagent such as a nitrite or a neutralizing reagent. Thus, a liquid flow speed; i.e., the time during which the specimen sample solution develops on the immunochromatographic test strip, can be controlled to be slow.

Examples of highly hydrophobic materials include polyethylene, polyester, polystyrene, polypropylene, rayon, and nylon.

A porous material used for a region to be impregnated with a neutralizing reagent has the following 3 properties. That is, such porous material is a woven fabric with the basis weight of 10 to 400 g/m$^2$ and thickness of 0.1 to 2.0 mm; such material has the high capacity for liquid absorption and the high capacity for liquid retention (liquid-retaining capacity), for example, the amount of liquid absorption per 1 cm/m$^2$ is 10 to 100 μl/cm$^2$, the speed of liquid absorption is 1.0 to 5.0 μl/sec, the amount of liquid retention is 10 to 100 μl/cm$^2$ after a fragment of 1 cm/m$^2$ in wet conditions is brought into contact with the membrane and allowed to stand for 5 minutes, and, preferably, a liquid-developed area is 20 mm$^2$ or smaller after a fragment of 1 cm/m$^2$ in wet conditions is brought into contact with the membrane and allowed to stand for 5 minutes; and liquid release is low or sustained. Specific examples include filter paper made of cellulose cotton fibers and glass filter paper made of glass fibers. A more specific example of such filter paper is No. 26-3 (Toyo Roshi Kaisha Ltd.). In addition, the capacity of the filter paper used is high, and the filter paper is thus capable of sufficiently retaining an acid solution coming from the upstream after the specimen. With the use of such porous material, the sample pad can be impregnated with a neutralizing reagent in an amount sufficient for neutralization of the specimen from which the sugar chain antigen has been extracted with nitrous acid generated upon the reaction between a nitrite and an acid reagent. Since the sample pad is capable of absorbing and retaining a large quantity of liquid and sustaining the liquid release, a sufficient capacity for neutralization can be retained when a nitrous acid-containing solution remaining upstream of the immunochromatographic test strip develops after the time of judgment, and an acid solution can be inhibited from reaching the antibody-immobilized detection region. As a result, a non-specific reaction can be inhibited, and a sugar chain antigen can be detected without causing a non-specific reaction. A specific example of a glass filter paper with the high capacity for liquid absorption, the high capacity for liquid retention, and low liquid releasability is GS-25 (Toyo Roshi Kaisha Ltd.). Such glass filter paper can be impregnated with a larger quantity of neutralizing reagent because of the high capacity for liquid absorption. In addition, such glass filter paper can prevent an acid solution from reaching the antibody-immobilized detection region because of the high capacity for liquid retention and low liquid releasability. As a result, a non-specific reaction can be inhibited in a negative case, and line coloring can be prevented after the time of judgment in a positive case.

The "basis weight" ("metsuke") of the porous material used for the region to be impregnated with a neutralizing reagent is 10 to 400 g/m$^2$. The term "basis weight" refers to a weight per unit area (1 m$^2$) of a fabric or the like. The basis weight can be adequately modified in accordance with the amount or composition of a neutralizing reagent to impregnate the pad. If the basis weight is 30 g/m$^2$ or less, the porosity becomes high, the material is likely to be torn when impregnated with a neutralizing reagent, and the material is difficult to handle during immunochromatographic production. Thus, the basis weight is preferably 50 g/m$^2$ to 300 g/m$^2$, because the material with the basis weight of 300 g/m$^2$ or more has the low porosity, the specimen would not smoothly impregnate the material depending on the neutralizing reagent composition, and the specimen would not be mixed with a neutralizing reagent. The most preferable basis weight is 250 to 270 g/m$^2$.

A "thickness" of the porous material used for the region to be impregnated with a neutralizing reagent is preferably 0.1 to 2.0 mm. The thickness can be adequately modified in accordance with the amount or composition of a neutralizing reagent to impregnate the pad. If the thickness is 0.4 mm or less, the material is likely to be torn when impregnated with a neutralizing reagent, and the material is difficult to handle during immunochromatographic production. Thus, the thickness is preferably 0.4 to 0.8 mm, and more preferably approximately 0.6 mm in terms of the ease of adjustment of the amount to be impregnated with a neutralizing reagent and the ease of handling during immunochromatographic production.

Regarding "liquid absorption," the amount of liquid absorption per 1 cm/m$^2$ is preferably 10 to 100 μl/cm$^2$, and the speed of liquid absorption is preferably 1.0 to 5.0 μl/sec. The amount of liquid absorption and the speed of liquid absorption are determined by preparing 200 μl of a colored solution (1% Tween 20+Red No. 102) in each cell of a 96-well EIA plate, introducing a test strip comprising a material of 5×60 mm adhered to a backing sheet thereinto, designating the end of the test strip impregnated with the solution as the lower end, measuring the time until the solution reaches the upper end of the test strip, removing the test strip immediately after the solution reaches the upper end, and measuring the amount of the solution remaining in the cell. The amount of liquid absorption is the amount of the solution determined by subtracting the amount of the solution remaining in the cell from 200 μl and dividing the obtained value by 1 cm$^2$ of the area of the material. The speed of liquid absorption is determined according to the amount of liquid absorbed/the time required to reach the upper end. The porous material used for the region to be impregnated with a neutralizing reagent is preferably high in the amount of liquid absorption and slow in the speed of liquid absorption. When the amount of liquid absorption is 30 μl/cm$^2$ or less, the immunochromatographic test strip cannot be impregnated with a sufficient amount of a neutralizing reagent depending on the concentration and the content of a solid acid reagent. Accordingly, the amount of liquid absorption is preferably 30 μl/cm$^2$ or more. The speed of liquid absorption of the porous material used for the region to be impregnated with a neutralizing reagent affects the time during which the sugar chain antigen is extracted from the specimen and the time during which the test solution is neutralized after extraction. The time of sugar chain antigen extraction can be regulated to some extent by the material or composition of a solid acid reagent, although such regulation is not perfect. Accordingly, the speed of liquid absorption of the porous material used for the region to be impregnated with a neutralizing reagent is critical for sufficient extraction and neutralization of a sugar chain antigen. Specifically, the speed of liquid absorption is preferably 1.0 to 5.0 and more preferably 2.0 μl/sec or lower.

The "capacity for liquid retention" is determined by placing a fragment of 1 cm/m$^2$ of the porous material used for the region to be impregnated with a neutralizing reagent on a membrane, adding 70 μl of a solution (1% Tween 20+Red No. 102) thereto, and measuring the weight before and after the membrane is allowed to stand for 5 minutes. While the amount of the retained solution varies depending on the composition of a solution (e.g., the amount of a surfactant or a protein) to be added, the amount of the retained liquid when tested with a 1% Tween 20 solution is preferably 10 to 100 and more preferably 15 μl/cm$^2$ or more.

The "capacity for liquid release" is determined by placing a fragment of 1 cm/m$^2$ of the porous material used for the region to be impregnated with a neutralizing reagent on a membrane, adding 70 μl of a solution (1% Tween 20+Red No. 102) thereto, and measuring the area in which the solution spreads on the membrane after the membrane is allowed to stand for 5 minutes. While such area varies depending on the composition of a solution (e.g., the amount of a surfactant or a protein) to be added, the area tested with a 1% Tween 20 is preferably 30 mm$^2$ or less, and more preferably 20 mm$^2$ or less.

For example, the porous material used for the region to be impregnated with a neutralizing reagent has the basis weight of 50 to 300 g/m$^2$ or 250 to 270 g/m$^2$, the thickness of 0.4 to 0.8 mm, the amount of liquid absorption per 1 cm/m$^2$ of 30 to 100 μl/cm$^2$, the speed of liquid absorption of 1.0 to 2.0 μl/sec, the amount of liquid retention of 15 to 100 μl/cm$^2$ after a fragment of 1 cm/m$^2$ in wet conditions is brought into contact with the detection region and allowed to stand for 5 minutes, and a liquid-developed area of 20 mm$^2$ or smaller after a fragment of 1 cm/m$^2$ in wet conditions is brought into contact with the membrane and allowed to stand for 5 minutes. A material with such properties has the high capacity for "sufficiently neutralizing the sugar chain antigen-containing acid solution because of the high capacity for liquid absorption and the high capacity for liquid retention in a region impregnated with a neutralizing reagent, suppressing the acid solution remaining because of low or sustained liquid releasability of the region impregnated with a neutralizing reagent from reaching the detection region, or allowing the sufficiently neutralized test solution to keep developing to the detection region." Thus, such material has higher effects of suppressing a non-specific reaction, compared with other materials.

The method for using the device of the present invention is described. The method for using the device described below comprises mixing a specimen with a nitrous acid solution and performing measurement using an immunochromatographic test strip impregnated with a solid acid reagent and a neutralizing reagent. A method of measurement comprising mixing a specimen with an acid solution and performing measurement using an immunochromatographic test strip impregnated with a nitrite and a neutralizing reagent can also be performed with reference to the method described below.

Measurement is initiated by mixing the specimen or a sample prepared using the specimen with a nitrite solution, allowing the specimen to suspend in the nitrite solution, and applying the suspension to the specimen dropping port of the device. In this case, 5 to 100 μl of the specimen may be mixed with 0.01 to 2 ml of a 0.1 M to 8 M nitrite solution, and 5 to 200 μl of the mixture may be applied to the dropping port. Examples of nitrite include sodium nitrite and potassium nitrite.

A specimen containing a sugar chain antigen as an analyte to be detected is supplied to the dropping port, the specimen moves to the sample pad, the specimen is developed by a capillary action to the solid acid reagent region 5 and the neutralizing reagent region 6 on the sample pad 4, and the specimen is developed horizontally and successively to the label region 2, the support 1, and the absorbent pad 7. In the solid acid reagent region 5, the nitrite mixed with the specimen reacts with the solid acid reagent on the solid acid reagent region 5 to generate free nitrous acid, so that an action of the nitrous acid allows a sugar chain antigen to be extracted from the specimen. The extracted sugar chain antigen is developed and moved together with an acidic developing solution to the neutralized reagent region 6, and the pH of the acidic developing solution containing the sugar chain antigen is neutralized and adjusted to the neutral range in the neutralizing reagent region 6. As a result, the sugar chain antigen is further developed and moved downstream under neutral conditions. In the label region 2, along with the development of the specimen sample, a label antigen is released into a solution and developed to the support 1. When a sugar chain antigen is present in the specimen sample, the sugar chain antigen is specifically captured by a capturing antibody in a detection region 3 of the support 1, and the sugar chain antigen causes a specific reaction with a labeled antibody to form a complex. This enables antibodies to construct a sandwich via the sugar chain antigen in the detection region 3, thereby measuring a labeled-antibody-sugar chain antigen complex in the detection region 3. The detection region can be observed through the judgement section of the immunochromatographic device.

According to a method using the immunochromatographic test strip of the present invention, extraction of a sugar chain antigen in a specimen is carried out on an immunochromatographic test strip, and therefore, it is not necessary to extract the sugar chain antigen in the specimen before measurement using the immunochromatographic test strip, making it possible to measure the sugar chain antigen in the specimen in a single step.

With the use of the immunochromatographic test strip comprising a pad impregnated with a solid acid reagent or a nitrite dehydrated according to the present invention, extraction can be performed efficiently.

The area of the specimen dropping port may be adjusted to substantially equivalent to the area of a pad impregnated with a solid acid reagent (i.e., a solid acid reagent region). Thus, a larger quantity of samples can be brought into contact with a solid acid reagent immediately. In addition, a highly hydrophobic non-woven fabric is employed as a member to be impregnated, so that the sample can be prevented from developing to the pad impregnated with a neutralizing reagent (i.e., a neutralizing reagent region) in the downstream region immediately after the sample is added. Thus, the sample is retained in the specimen addition section for 1 to 2 minutes, and antigen extraction can be sufficiently performed.

When a solid acid reagent region or a nitrite region is adjacent to and overlapped with a neutralizing reagent region, in the present invention, a liquid-impermeable sheet is inserted into a space between the solid acid reagent region or the nitrite region and the neutralizing reagent region. By providing such sheet, the following 3 effects can be exerted.

(A) Reagent movement in adjacent 2 regions can be suppressed during storage of a test strip. As a result, a reaction caused upon contact between a solid acid reagent or a nitrite and a neutralizing reagent can be prevented. Thus, reagent stability can be improved.

(B) When a specimen mixed with a nitrite or an acid reagent is added, insufficient sugar chain antigen extraction caused when the specimen reaches a solid acid reagent region or a nitrite region and moves to a neutralizing reagent region immediately thereafter can be prevented. Specifically, the speed of the liquid containing the specimen moving from a solid acid reagent region or a nitrite region to a neutralizing reagent region is lowered, a period during which the specimen-containing liquid remains in solid acid reagent region or a nitrite region is prolonged, and, as a consequence, the sugar chain antigen can be sufficiently extracted. This improves measurement sensitivity.

(C) When a specimen mixed with a nitrite or an acid reagent is added, disadvantageously, the specimen reaches a solid acid reagent region or a nitrite region, the specimen moves to a neutralizing reagent region immediately thereafter, a liquid containing the moved specimen flows backward to the solid acid reagent region or the nitrite region, activity of the solid acid reagent or the nitrite is lowered, and extraction efficiency is lowered. Such disadvantageous phenomena can further be prevented. Specifically, a liquid containing the specimen that has once reached the neutralizing reagent region can be prevented from flowing backward to the solid acid reagent region or the nitrite region, activity of the solid acid reagent or the nitrite can be prevented from lowering, and sugar chain antigen extraction with nitrous acid is allowed to efficiently proceed. This improves measurement sensitivity.

A material of a sheet to be provided in a space between the solid acid reagent region or the nitrite region and the neutralizing reagent region is not particularly limited, provided that it does not allow a liquid to permeate therethrough. Examples of sheet that can be used include a resin sheet, such as a PET (polyethylene terephthalate) sheet and a polyethylene sheet. A resin sheet is also referred to as a resin film.

A sheet may be provided in a manner such that the solid acid reagent region or the nitrite region would partially overlap with the neutralizing reagent region. In such a case, it is preferable that the length of a region where the solid acid reagent region or the nitrite region would overlap with the neutralizing reagent region be as small as possible. For example, such length is 5 mm or less, preferably 3 mm or less, and more preferably 2 mm or less.

Alternatively, a sheet may be provided in a manner such that the solid acid reagent region or the nitrite region would not be in contact with the neutralizing reagent region and a pad impregnated with an acid reagent or a nitrite would be overlaid on a PET sheet. In such a case, the neutralizing reagent region may be completely covered with a sheet, and the solid acid reagent region or the nitrite region may be provided on the sheet. A liquid within the solid acid reagent region or the nitrite region would not move directly to the neutralizing reagent region, but liquid flow on the sheet and then reaches the neutralizing reagent region.

A sheet may be selectively provided in, for example, a space between the solid acid reagent region or the nitrite region and the neutralizing reagent. When a resin sheet is adhered to an immunochromatographic test strip so as to cover the upper side thereof as a top laminate sheet, in contrast, a top laminate sheet may be adhered to cover a region other than the solid acid reagent region or the nitrite region. When the solid acid reagent region or the nitrite region also serves as the sample pad, a top laminate sheet may be adhered to regions other than the sample pad; i.e., the neutralizing reagent region, the label region, the support, the detection region, and the absorbent pad. The solid acid reagent region or the nitrite region may be adhered to the upper region of the top laminate sheet adhered to the upper region of the neutralizing reagent region.

In the method of the present invention, a biological sample used as a specimen is not particularly limited. Examples of such a biological sample include body fluid, such as serum, plasma, blood, urine, feces, saliva, tissue fluid, spinal fluid, or swab solution, and a diluted product thereof.

In the method using an immunochromatographic device of the present invention, an analyte to be detected as a specimen is a sugar chain antigen, which can be measured by an immunoassay, namely, an assay utilizing an antigen-antibody reaction. An example of the antigen is a polysaccharide that is a sugar chain antigen present on the cell wall of bacteria extracted by a nitrous acid extraction treatment. Protozoa, fungi, bacteria, mycoplasma, rickettsia, chlamydia, virus, and others comprising the aforementioned substances can also be measured. According to the method using an immunochromatographic test strip of the present invention, whether or not a sugar chain antigen derived from protozoa, fungi, bacteria, mycoplasma, rickettsia, chlamydia, virus, etc. is contained in a biological sample of a subject can be confirmed. When such a sugar chain antigen is contained, it can be determined that the subject is affected with infection caused by protozoa, fungi, bacteria, mycoplasma, rickettsia, chlamydia, virus, etc. The presence or absence of infection with, for example, group A β-hemolytic *Streptococcus* (*Streptococcus pyogenes*), *Escherichia coli*, *Legionella*, *Campylobacter*, etc. can be detected.

EXAMPLES

Hereafter, the present invention is described in more detail with reference to the following examples, although the scope of the present invention is not limited to these examples.

In the following examples, % represents w/v % unless otherwise specified.

Example 1

Examination of Dropping Port Size

1. Immobilization of Anti-*Streptococcus pyogenes* (Group a β-Hemolytic *Streptococcus*) Antibody on Nitrocellulose Membrane (Support)

A solution obtained by dilution of an anti-*Streptococcus pyogenes* antibody to 1.0 mg/ml with purified water and an anti-rabbit IgG antibody were prepared. The anti-*Streptococcus pyogenes* antibody was linearly applied to a sample pad side of a nitrocellulose membrane backed with a PET (polyethylene terephthalate) film, and the anti-rabbit IgG antibody was linearly applied to an absorbent pad side thereof. Then, the nitrocellulose membrane was dried at 45° C. for 30 minutes and an anti-*Streptococcus pyogenes* antibody-immobilized membrane was obtained. This membrane is referred to as an "antibody-immobilized membrane" in the present example.

2. Immobilization of Anti-*Streptococcus pyogenes* Antibody on Colored Polystyrene Particles The anti-*Streptococcus pyogenes* antibody was diluted to 1.0 mg/ml with purified water, colored polystyrene particles were added thereto to a density of 0.1% therein, the resultant was stirred, carbodiimide was added thereto to a density of 1% therein, and the mixture was further stirred. A supernatant was removed by a centrifugal operation and then, the remaining was re-suspended in 50 mM Tris (pH 9.0) and 3% BSA, so that a 0.04% anti-*Streptococcus pyogenes* antibody-bound colored polystyrene particle suspension was obtained. These particles are referred to as "antibody-immobilized particles" in the present example.

3. Application and Drying of Anti-*Streptococcus pyogenes* Antibody-Conjugated Colored Polystyrene Particles A predetermined amount of the antibody-immobilized particle suspension produced in the above 2 was applied to a non-woven fabric, and it was dried at 45° C. for 30 minutes. The obtained non-woven fabric is referred to as a "dry pad" in the present example.

4. Production of a Neutralizing Reagent (Basic Reagent) Pad

3M Trizma™ Base (Tris base) as a neutralizing reagent (basic reagent) and 1.5% Triton X100 were applied to filter paper at 30 μl/cm (No. 26-3, Toyo Roshi Kaisha Ltd.).

5. Production of a Solid Acid Reagent Pad 1.0 M tartaric acid as a solid acid reagent and 0.5% Triton X100 were applied to a non-woven fabric (ELEVES® UNITIKA Ltd.) at 13 μl/cm. Immediately thereafter, the fabric was dried at 45° C. for 1 hour to obtain a solid acid reagent-impregnated non-woven fabric.

6. Production of Immunochromatographic Test Strip for Detection of *Streptococcus Pyogenes*

The antibody-immobilized membrane prepared in the above 1, the dry pad prepared in the above 3, the neutralizing reagent (a basic reagent) pad prepared in the above 4, the solid acid reagent pad prepared in the above 5, and other materials (the backing sheet and the absorbent pad) were adhered to each other, and the resultant was cut into pieces in a width of 5 mm to obtain test strips for detection of *Streptococcus pyogenes*. In the present example, a test strip using filter paper impregnated with a solid acid reagent and a neutralizing reagent (a basic reagent) as a sample pad is referred to as "the immunochromatographic test strip of the present invention." The immunochromatographic test strip comprises a solid acid reagent-impregnated non-woven fabric, a neutralizing reagent (basic reagent)-impregnated non-woven fabric, a dry pad (a label region), an antibody-immobilized membrane (a detection region), and an absorbent pad in that order in a downward direction along the flow of the specimen.

7. Immunochromatographic Device

The immunochromatographic test strip of the present invention was integrated into a storing cassette with a dropping port length (longer side length) of 5 mm ((1) with a small dropping port) to produce the immunochromatographic device (1). Also, the immunochromatographic test strip of the present invention was integrated into a storing cassette with a dropping port length (longer side length) of 10 mm ((2) with a large dropping port) to produce the immunochromatographic device (2). The storing cassettes of the immunochromatographic devices (1) and (2) are storing cassettes that have been conventionally used, and neither the lower vessel portion nor the upper lid portion comprise a support having a protrusion of a sloped configuration of the storing vessel of the immunochromatographic device described below. A lower portion of a conventional storing vessel is referred to as "a conventional vessel portion," and an upper lid portion of a conventional storing cassette is referred to as "a conventional lid portion."

A lower portion of a storing cassette comprising a support having a protrusion with a decreasing slope in a downward direction of the immunochromatographic test strip to support the immunochromatographic test strip by pushing the lower side thereof (referred to as "the cassette portion with the sloped lower support", an upper lid portion of a storing cassette comprising a support having a protrusion—with an increasing slope in a downward direction of the immunochromatographic test strip to support the immunochromatographic test strip by pushing the upper side thereof (referred to as "the lid portion with the sloped upper support", the conventional cassette portion, and the conventional lid portion were combined as described below to produce the immunochromatographic devices (3) to (5) each comprising the immunochromatographic test strip integrated thereinto. The immunochromatographic devices (3) to (5) were subjected to the test described below. The upper lid portions of the immunochromatographic devices (3) to (5) each have a dropping port length of 10 mm:

(3) the lid portion with the sloped upper support and a conventional cassette portion;
(4) the lid portion with the sloped upper support and the cassette portion with the sloped lower support; and
(5) a conventional lid portion and the cassette portion with the sloped lower support.

8. Specimens

*Streptococcus pyogenes* was cultured, and the culture solution was adjusted to $1.0 \times 10^7$ CFU/ml with physiological saline.

As a negative specimen, physiological saline was used.

9. Measurement

The specimen (20 μl) was suspended in 180 μl of a sodium nitrite solution (2.0 M $NaNO_2$, 1% Tween 20), and 75 μl of the suspension was added to the dropping port of the immunochromatographic device according to the present invention. As a conventional method, the specimen was suspended in a nitrous acid extract comprising sodium nitrite mixed with hydrochloric acid, and 50 μl of the specimen suspension neutralized with a Tris solution was added to the dropping port of a conventional immunochromatographic device (the device comprising neither the acid reagent nor the neutralizing reagent immobilized thereon). Deposition of colored polystyrene particles in a given position where the anti-*Streptococcus pyogenes* antibody has been immobilized was detected 10 minutes later, and an extent of deposition was evaluated "+++," "++," and "+" in a descending order of signal intensities. A specimen was evaluated "±" when the judgment was difficult to make, and a sample emitting no signal was evaluated "−."

10. Results

Device Conditions (1) Small dropping port
(2) Large dropping port
(3) Large dropping port, sloped upper support
(4) Large dropping port, sloped upper support, sloped lower support
(5) Large dropping port, sloped lower support Positive Specimens

| Development time | (1) | (2) | (3) | (4) | (5) |
| --- | --- | --- | --- | --- | --- |
| 1 min | − | − | − | − | − |
| 2 min | − | ± | + | ± | + |
| 3 min | − | + | + | + | + |
| 4 min | − | + | + | + | + |
| 5 min | ± | + | + | + | + |
| 6 min | ± | + | + | + | + |
| 7 min | + | + | + | ++ | + |
| 8 min | + | + | + | ++ | + |
| 9 min | + | + | ++ | ++ | + |
| 10 min | + | + | ++ | +++ | ++ |
| Development start time (sec) | 155 | 47 | 46 | 50 | 48 |

In comparison with the immunochromatographic device (1) with a small dropping port, liquid development is initiated faster with the use of the immunochromatographic devices (2), (3), (4), and (5) with large dropping ports. Thus, the immunochromatographic devices (2), (3), (4), and (5) were capable of making positive evaluation more rapidly.

Signals emitted by the immunochromatographic devices (3), (4), and (5) comprising supports with sloped protrusions provided in the upper lid portion and/or the lower cassette portion 10 minutes later were stronger than the immunochromatographic devices (1) and (2) without supports with sloped protrusions. In particular, signals emitted by the immunochromatographic device (4) comprising supports with sloped protrusions provided in the upper lid portion and the lower cassette portion 10 minutes later were stronger than the immunochromatographic devices (3) and (5) comprising a support with a sloped protrusion in either the upper lid portion or the lower cassette portion.

REFERENCE SIGNS LIST

1 Support (including detection region)
2 Label region
3 Detection region
4 Sample pad
5 Solid acid reagent region
6 Neutralizing reagent region
7 Absorbent pad
8 Backing sheet
9 Immunochromatographic test strip
10 Storing cassette
11 Lid portion of storing cassette
12 Lower portion of storing cassette
13 Dropping port of device
14 Judgement section of device
15 Protrusion of lid portion of storing cassette
16 Sloped part of lower portion of storing cassette

INDUSTRIAL APPLICABILITY

Use of the immunochromatographic device according to the present invention allows detection of infection with group A β-hemolytic *Streptococcus* with high sensitivity.

All publications, patents, and patent applications cited in the present description are incorporated herein by reference in their entirety.

The invention claimed is:

1. An immunochromatographic device comprising an immunochromatographic test strip for extracting and measuring a sugar chain antigen in a specimen and a cassette for accommodating the test strip, wherein:
    the immunochromatographic test strip comprises a sample pad to which a specimen mixed with the nitrite or acid solution is added, a label region comprising a labeled antibody obtained by labeling an antibody against the sugar chain antigen, and a detection region on which the antibody against the sugar chain antigen is immobilized, an antibody-sugar chain antigen-labeled antibody complex is formed in the detection region to measure the sugar chain antigen, and the immunochromatographic test strip has a region impregnated with a neutralizing reagent upstream of the label region and further has, upstream of the region impregnated with the neutralizing reagent, a region impregnated with a solid acid reagent when the specimen mixed with the nitrite is used or a region impregnated with the nitrite when the specimen mixed with the acid solution is used,
    the cassette is composed of an upper lid portion and a lower portion, the upper lid portion comprises an upper support having a protrusion that supports the upper side of the immunochromatographic test strip, and the lower cassette portion comprises a lower support comprising a protrusion that supports the lower side of the immunochromatographic test strip,
    the immunochromatographic device comprises a specimen dropping port on top of a sample pad of the immunochromatographic test strip, and
    the upper support that supports the immunochromatographic test strip has the following features (i) to (iii) and the lower support that support that supports the immunochromatographic test strip has the following features (iv) to (vi):
    (i) the upper support is provided to form an edge of an opening on the side of the dropping port opposite from the side to which the specimen is added, and is formed of a sloped protrusion;
    (ii) when the upper support pushes the upper side of the sample pad of the immunochromatographic test strip in a downward direction, the height of the protrusion becomes smaller toward the downstream side of the immunochromatographic test strip, that is, the protrusion has an increasing slope toward the downstream side of the immunochromatographic test strip;
    (iii) when the upper support of the upper lid portion pushes the sample pad, the pressure becomes lower in a downward direction;
    (iv) the lower support is formed of a sloped protrusion provided in a region corresponding to the specimen dropping port of the lower cassette portion, wherein the region corresponding to the specimen dropping port of the lower cassette portion is a region overlapping with the opening of the specimen dropping port when the lower cassette portion is covered by the upper lid portion;
    (v) when the lower support pushes the sample pad of the immunochromatographic test strip, the height of the protrusion becomes smaller toward the downstream side of the immunochromatographic test strip, that is, the protrusion has a decreasing slope toward the downstream side of the immunochromatographic test strip;
    (vi) the pressure to push the sample pad becomes lower in a downward direction.

2. The immunochromatographic device according to claim 1, wherein the sugar chain antigen is a sugar chain antigen of protozoa, fungi, bacteria, *Mycoplasma, Rickettsia, Chlamydia*, or virus.

3. A method of measuring a sugar chain antigen in a specimen by promoting sugar chain antigen extraction by an immunochromatographic method using the immunochromatographic device according to claim 1, comprising mixing the specimen with a nitrous acid solution when the immunochromatographic device has a region impregnated with a solid acid reagent, or mixing the specimen with an acid solution when the immunochromatographic device has a region impregnated with a nitrite, and adding the mixture to a sample pad of the immunochromatographic test strip, wherein
    the sugar chain antigen is extracted from the specimen by the action of nitrous acid generated through a reaction of the nitrite with the solid acid reagent in the region impregnated with the solid acid reagent or the region impregnated with the nitrite, the acid solution containing the sugar chain antigen is neutralized in a region impregnated with a neutralizing reagent, and an antibody-sugar chain antigen-labeled antibody complex is formed in a detection region.

* * * * *